June 23, 1964 R. L. SMIRL 3,138,012
DRIVEN PLATE ASSEMBLY
Filed Aug. 27, 1962 2 Sheets-Sheet 1

Uniform shear distribution of prior art.

Inventor:
Richard L. Smirl
By Joseph W. Malleck Atty.

June 23, 1964　　　R. L. SMIRL　　　3,138,012
DRIVEN PLATE ASSEMBLY
Filed Aug. 27, 1962　　　　　　　　　　　　2 Sheets-Sheet 2
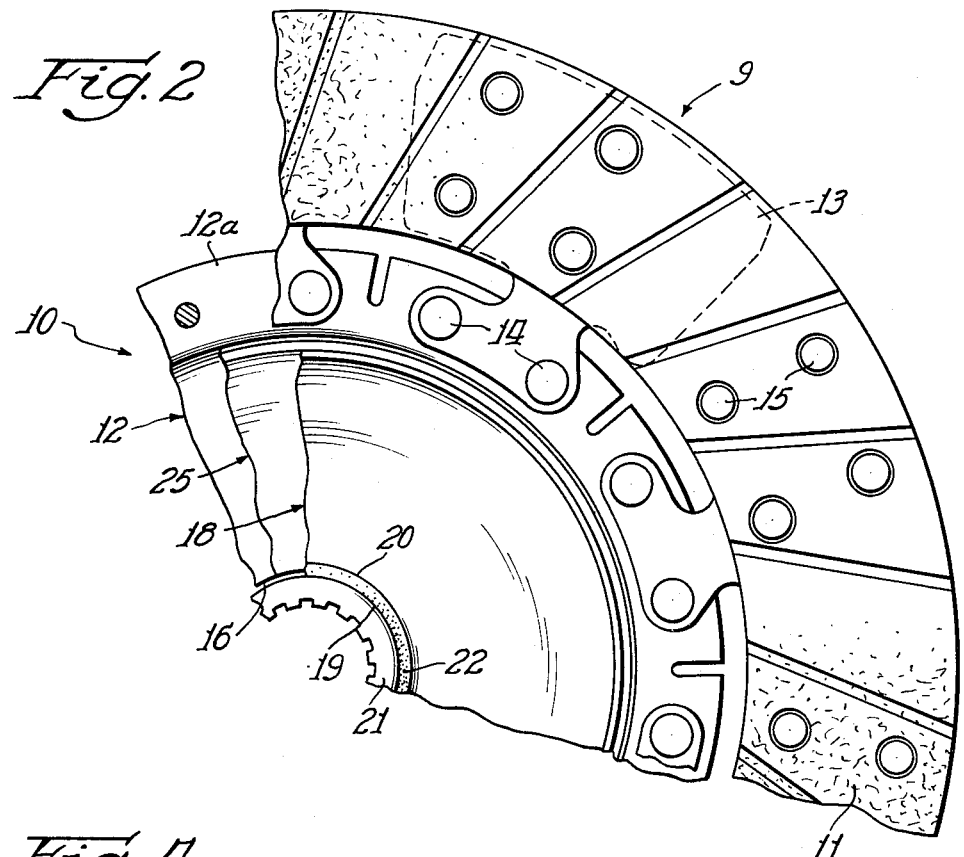
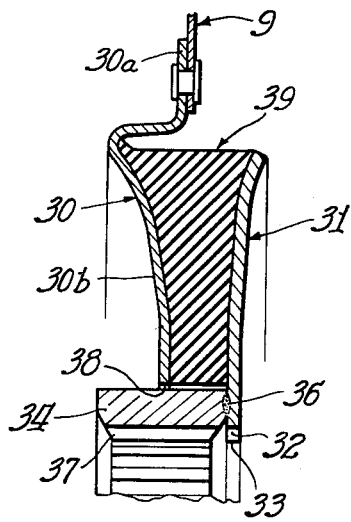
Inventor:
Richard L. Smirl
By: Joseph W. Malleck Atty

United States Patent Office 3,138,012
Patented June 23, 1964

3,138,012
DRIVEN PLATE ASSEMBLY
Richard L. Smirl, La Grange Park, Ill., assignor to Borg-Warner Corporation, a corporation of Illinois
Filed Aug. 27, 1962, Ser. No. 219,509
4 Claims. (Cl. 64—27)

This invention relates to friction driven assemblies and more particularly to torsional vibration dampening means adapted to transmit torque between elements of said driven assembly.

In general, the invention contemplates employment of an annular cushion of rubber or equivalent material, adapted to transmit torque between the sides or facings of adjacent plates of the driven plate assembly through shear stresses set up in the cushion ring. Torsional vibration dampeners of this general type are old, but the invention herein contemplates an improved and simplified construction wherein the bond between the ring and side plates is subject to less destruction while at the same time providing a torsional dampening means of greater capacity. A specific feature of this invention is the employment of a rubber ring having opposite sides thereof bonded throughout its radial extent to the sides of adjacent plates and having a thickness which varies throughout its radial extent in a manner so that the thickness at the outermost and innermost peripheral portions thereof will be greater than that necessary to accommodate uniform stress distribution throughout the radial extent of the ring.

In past art, rubber torsional dampening rings have been constructed with a thickness increasing from its innermost radial extent to its outermost radial extent in a uniform manner, such as is disclosed in U.S. Patent 2,299,029 and assigned to the assignee of this invention. Where the rubber ring is bonded throughout substantially the entire exposed sides thereof, the critical factor in determining the life of the torsional dampener is dependent upon the stress at the bonded areas. It has been discovered that most destruction takes place at the innermost and outermost peripheries or edges of the bond and more particularly at the outermost periphery. Accordingly, it is another object of this invention to provide a torsional vibration dampener for a driven plate assembly having plates provided with dish-shaped portions adapted to accommodate a rubber cushion ring therebetween in flush bonded relationship, the dish-shaped portions having their convex sides thereof facing each other and enabling the ring to have a thickness which varies so that a curve representing the thickness value would be generally asymptotic to a cone representing the value of equal shear distribution throughout the radial extent of the ring.

Other objects, advantages and uses of the invention will become more apparent after reading the following specification and claims, and in consideration of the drawing forming a part of the specification, wherein:

FIGURE 2 is a side elevational view of a portion of the driven plate assembly of FIGURE 1 and having portions thereof broken away to better illustrate the construction;

FIGURE 4 is a central sectional elevational view of another embodiment of this invention.

Figure 1:
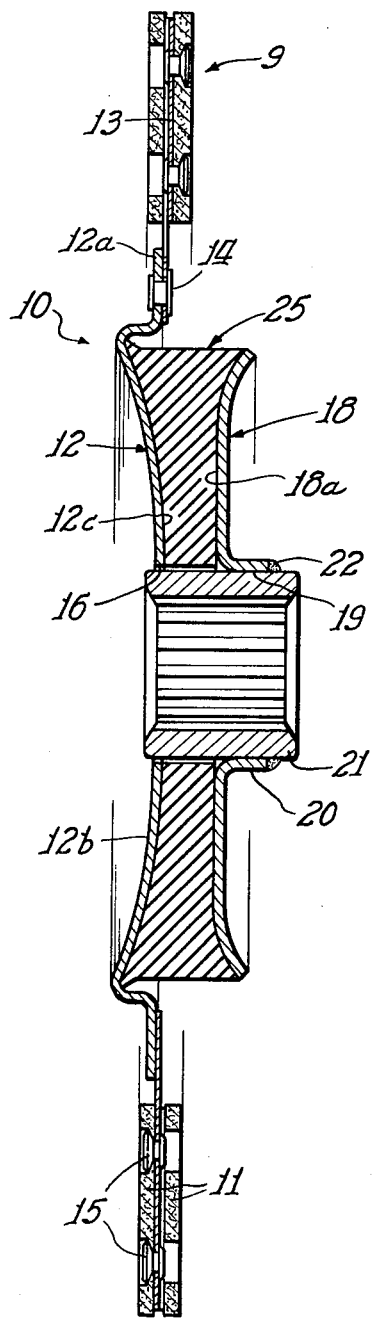
FIGURE 1 is a central sectional elevational view of a clutch driven plate assembly embodying the principles to this invention.

As an example of one form in which the invention may be embodied, I have shown in FIGURES 1 and 2 a clutch-driven plate assembly, generally designated 9, comprising a driving member or means 10 of the assembly having an annular plate with a radially extending outermost flange 12a carrying a series of circumferentially separated cushion members 13 fastened thereto by suitable means such as rivets 14. Each of the cushions 13 are of thin resilient sheet metal and have friction material 11 secured to opposite sides thereof by suitable fasteners, such as rivets 15. Plate 12 may be constructed of thin sheet metal having a thickness generally in the range of .020 inches. The plate 12 has a central opening 16 formed therein and has a generally dish-shaped portion 12b adjacent the opening.

The assembly 9 further comprises a driven plate 18 having a central opening 19 formed therein and an integral sleeve projection 20 extending outwardly from one side thereof. The sleeve projection 20 is adapted to fit about a central sleeve hub 21 and it may be joined thereto by suitable means such as welding shown at 22. The sleeve hub 21 is internally splined to adapt the driven member thereof for driving connection to an output member such as a shaft. The driving plate 12 is adapted to have the opening 16 slightly spaced from an outer periphery of the sleeve hub 21. The driven plate 18 is also slightly dish-shaped and is adapted to have its convex surface 18a thereof facing the convex surface 12c of said driving plate 12. Plates 18 and 12 are adapted to be in close adjacent spaced relationship to accommodate the resilient rubber cushion ring 25 therebetween.

To permit the transmission of torque between the drive and driven plates 18 and 12 of the driven assembly and to dampen vibrations being transmitted, the rubber cushion ring 25 is vulcanized or bonded to the convex sides of said plates facing each other and adapted to set up a yielding drive therebetween which absorbs and dampens relative rotative oscillations between the plates through the setting up of shear stresses in the rubber. Relative rotation or travel in the range of 12 degrees is permitted between the plates as limited by the rubber ring.

Figure 3:
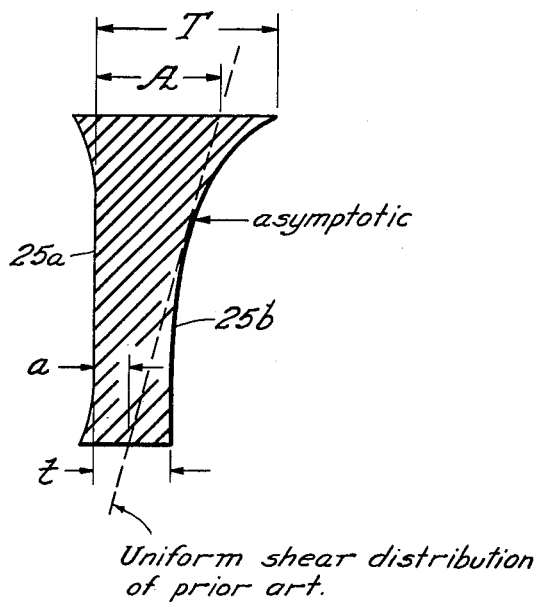
FIGURE 3 is an enlarged fragmentary portion of the torsional vibration adapting means and illustrating a stressed condition of the means.

In prior art constructions of the flat sided type, it has been appreciated that the shear distribution throughout the radial extent of the cushion ring will assume a straight line as that shown in dotted outline in FIGURE 3. The shear distribution will be uniform throughout the radial extent. Prior art constructions have been shaped, therefore, to accommodate uniform stress distribution to permit the plates to rotate relative to each other and provide a limited amount of angular travel. However, since the cushion ring is bonded substantially throughout the entire exposed side faces, it has now been found, according to this invention, that deterioration takes place first at the outermost radial periphery and also at the innermost radial periphery of the bond. It is therefore contemplated by this invention to increase the thickness of the cushion ring at these areas where the critical deterioration will take place while retaining the normal given thickness of the intermediate portions of the ring which determines the maximum stress distribution throughout the ring.

In the preferred embodiment, the side 25a of the cushion ring bonded to the convex surface 12c of plate 12 has a general gradually changing curve (viewed in cross section) which generally assumes a parabolic shape and can be noted to be somewhat asymptotic to the general slope of the line indicating stress distribution throughout the radial extent of a flat sided ring. The other face 25b or surface of the cushion ring which is bonded to the convex surface 18a of plate 18 may be generally flat for some portions thereof and flared outwardly near its outermost radial margin to form a curvature greater than that of any portion of convex surface 12c of plate 12. The stress at the outer periphery will be a fraction of the maximum shear which may be experienced and may be mathematically expressed as $A/T=S_{max}$. ($S_{max}$ being equal to the maximum stress at the asymptote.) The stress at the inner periphery similarly will be a fraction of the maximum shear which may be experienced and may be expressed as $a/t=S_{max}$. This construction results in lower stresses at the innermost and outermost peripheries; if critical stresses do occur at the outermost periphery, it would thereby indicate that the damper can operate satisfactorily with 50% higher maximum stress within the rubber with only a slight increase in the volume of rubber used over prior art constructions. Being able to work to a higher maximum stress level within the rubber cushion torsional vibration dampening ring results in a more efficient use of rubber and results in the following advantages: a large deflection or rotational travel between the plates with the same volume or rubber because the rubber is stressed further; a larger torque capacity is possible with the same volume of rubber because the higher stress indicates higher loads are possible; greater dampening capacity is possible with the same volume of rubber because the rubber is subjected to greater deflection, and a more efficient use of rubber results in a more practical design because the space for the damper is limited.

In the embodiment shown in FIGURE 4, the driven plate assembly 9 comprises a driving member 30 having an outer peripheral flange 30a mounting the cushion plates and friction material and having an inner contoured portion 30b. The driven member 31 comprises a substantially flat annular plate having a central opening 32 carrying splines 33 formed on the walls of the opening 32 and adapted to directly connect with a driven shaft (not shown) and impart torque directly thereto. A sleeve hub member 34 is joined to a margin of said plate 31 about the opening 32 by such means as resistance welding shown at 36. The sleeve hub member 34 has splines 37 formed on its interior surface and in general alignment with the splines of the plate 31.

The plate 30 has a central opening 38 adapted to receive the sleeve hub member 34 in slight spaced relationship. An annular rubber cushion or ring 39 disposed between the plates 31 and plate portion 30b has opposite sides thereof bonded throughout its radial extent thereto. The sides of the ring are flush with the facing surfaces of the plates and conform thereto. The interior of ring 39 varies so that the thickness at the outer and innermost radial peripheries will be greater than that necessary to accommodate the maximum shear of such locations during operation.

It will be apparent to those skilled in the art to which my invention pertains that various modifications and changes may be made therein without departing from the spirit of my invention or the scope of the appended claims.

What is claimed is:

1. In a friction device of the annular disc type, a torsional vibration dampener comprising: an annular driving plate, an annular driven plate in close adjacent spaced relationship to said driving plate and having sides thereof facing each other, and an annular ring of resilient material bonded to each of said sides facing each other throughout substantially the radial extent thereof, said annular ring having a radially intermediate portion adapted to experience maximum shear stress thereat before the inner and outer radial portions of said ring and having the thickness of each said inner and outer radial portions greater than that necessary to accommodate maximum uniform shear stress throughout experienced at such radial locations.

2. In a friction device of the annular disc type, a torsional vibration dampener comprising: drive and driven metallic plates in adjacent spaced relationship with sides thereof facing each other, an annular rubber ring disposed therebetween and having opposite sides bonded to the sides of said plates facing each other, said bonding being substantially throughout the sides of said ring, said ring having a thickness which increases radially outwardly along a curve which is generally asymptotic to a cone generally representing equal shear distribution throughout the radial extent of said ring.

3. A torsional vibration dampening means comprising: an annular driven plate mounted about a central hub and welded thereto, a driving plate having a central opening surrounding said hub and slightly spaced therefrom, said plate being closely adjacent and in spaced relationship with sides thereof facing each other, a resilient rubber ring disposed between said plates and having opposite sides adapted to be bonded throughout its radial extent to the sides of said plates facing each other, said plate sides and ring sides which are bonded being formed so that one side of said ring has a parabolically shaped surface and the other side of said ring is substantially flat throughout except for a flared portion near the radially outermost periphery thereof, said resilient ring adapted to permit limited relative movement between said plates while setting up stresses within the resilient material.

4. A clutch driven plate assembly, comprising: a driving metallic disc carrying friction material thereon and having a dish-shaped radially innermost portion, a driven plate having a central opening provided therein and having splines formed on the wall defining said central opening, a sleeve member having one end thereof bonded to a margin of said driven plate adjacent the central opening thereof and said sleeve member having splines formed on the interior surface thereof in alignment with the splines of said driven plate, said driven plate having a dish-shaped portion slighter in curvature than said driving plate portion, said driving and driven plates having convex sides of said dish-shaped portions facing each other and in close space relationship, a rubber resilient ring having a central opening slightly spaced from the outer surface of said sleeve member and having opposite sides thereof contoured to fit in flush bonded relationship with the convex sides of said plate portions, said ring having a thickness varying throughout its radial extent so that the innermost and outermost peripheries thereof have a thickness greater than that necessary to accommodate equal stress distribution throughout the radial extent of the ring and while permitting limited relative rotation between the plates.

References Cited in the file of this patent

UNITED STATES PATENTS

| | | |
|---|---|---|
| 2,051,442 | Geyer | Aug. 18, 1936 |
| 2,299,029 | Nutt | Oct. 13, 1942 |
| 2,556,624 | Macbeth | June 12, 1951 |